United States Patent [19]

Fischer et al.

[11] Patent Number: 5,663,263

[45] Date of Patent: Sep. 2, 1997

[54] AQUEOUS THICKENER COMPOSITION AND PROCESS FOR MAKING SAME

[75] Inventors: Stephen A. Fischer, Yardley; Chase J. Boudreaux, North Wales, both of Pa.

[73] Assignee: GEO Specialty Chemicals, Inc., Cleveland, Ohio

[21] Appl. No.: 676,710

[22] Filed: Jul. 8, 1996

[51] Int. Cl.$^6$ ............................................. C08F 20/10
[52] U.S. Cl. .................................................... 526/318.41
[58] Field of Search ......................................... 526/318.41

[56] References Cited

U.S. PATENT DOCUMENTS

| | | |
|---|---|---|
| 4,397,984 | 8/1983 | Wendel et al. ............................ 524/814 |
| 5,349,026 | 9/1994 | Emmons et al. . |
| 5,426,129 | 6/1995 | Emmons et al. . |
| 5,506,324 | 4/1996 | Gartner et al. . |

OTHER PUBLICATIONS

JP94-244909(940914) Takamatsu abstract pp. 5-8, 122.
JP94-55455(940325) Kubota abstract pp. 8-10, 123.

*Primary Examiner*—Joseph L. Schofer
*Assistant Examiner*—N. Sarofim
*Attorney, Agent, or Firm*—Thompson Hine & Flory LLP

[57] ABSTRACT

A water retention aid/thickener composition containing: (a) from about 40 to about 75% by weight of a $C_1$–$C_8$ alkyl acrylate; (b) from about 60 to about 25% by weight of methacrylic acid; and (c) from about 0.1 to about 5% by weight of an alkoxylated acrylate or methacrylate monomer containing at least three vinyl moieties, all weights being based on the weight of the composition.

27 Claims, No Drawings

AQUEOUS THICKENER COMPOSITION AND PROCESS FOR MAKING SAME

FIELD OF THE INVENTION

The present invention generally relates to a novel aqueous thickener and water retention aid for use in paper coating compositions.

BACKGROUND OF THE INVENTION

Paper coating compositions are applied onto paper substrates in order to improve optical properties such as brightness, smoothness, gloss and ink receptivity of the finished coated paper and paperboard.

Coating compositions are generally applied in the form of water suspensions containing a pigment, i.e., clay, calcium carbonate, talc, titanium dioxide, zinc oxide, etc., a latex binder, a coating insolubilizer such as melamine-formaldehyde, glyoxal-urea resins, a lubricant such as calcium stearate, a pigment dispersant such as polyacrylate, a defoamer and a water retention aid acting as a thickener or rheology modifier.

The water retention aid controls water loss of the coating composition by slowing the migration of water into the paper substrate caused by capillary pressure, mechanical pressure and vacuum pressure during the coating process. Water retention aids also significantly change the rheological properties of the coating composition which can be used to control rheology-related coating properties such as coating weight, coating structure relating to pigment and latex flocculation and machine runnability.

Commercial water retention aids fall into three category types: alginates, cellulosics and polyacrylates. Alginates are linear anionic polymers containing gluronic and mannuronic units. They are typically used in paper coating compositions to hold pigments and binders on the surface of the paper substrate. The coating composition is applied onto the paper substrate at relatively low speeds and high solids content.

Cellulosics include carboxymethyl, hydroxyethyl and hydrophobically modified cellulose. The performance of cellulosics are formula dependent, but in general they exhibit good water retention properties and function as co-binders in paper coating compositions. Cellulosics come in a variety of grades (molecular weight, degree of carboxylation, etc.) and are more tolerant to calcium ions than alginates. They tend to form stable solutions over a broad pH range. Hydroxyethyl cellulose is reported to adsorb onto clays more so than carboxymethyl cellulose and, consequently, higher doses are required in order to obtain equivalent water retention properties.

Polyacrylates typically consist of copolymers of ethyl acylate and methacrylic acid and are considered alkali-swellable emulsions. In general, they can be made by copolymerizing acrylic (methacrylic) acid with a variety of other monomers. Polyacrylates are pH sensitive and must be used at a pH above 8 in order to thicken a paper coating composition. These alkali swellable emulsions are effective thickeners due to their relatively high molecular weight and extended chain configuration. However, due to their sensitivity to pH, salt content, and the presence of multi-valent ions in the paper coating composition, they can be difficult to control.

SUMMARY OF THE INVENTION

The present invention is directed to a novel water retention aid/thickener composition for use in aqueous compositions, the novel composition containing:

(a) from about 40 to about 75% by weight of a $C_1$–$C_8$ alkyl acrylate;

(b) from about 60 to about 25% by weight of methacrylic acid; and (c) from about 0.1 to about 5% by weight of an alkoxylated acrylate or methacrylate monomer containing at least three vinyl moieties, all weights being based on the weight of the composition.

The present invention is also directed to a process for making a water retention aid/thickener composition involving the steps of:

(a) providing a $C_1$–$C_8$ alkyl acrylate monomer;

(b) providing a methacrylic acid monomer;

(c) providing an alkoxylated acrylate or methacrylate crosslinking monomer containing at least three vinyl moieties; and (d) polymerizing components (a)–(c) in an aqueous emulsion.

The present invention is also directed to a process for modifying the rheological properties of an aqueous composition involving adding to the aqueous composition from about 0.1 to about 5% by weight, based on the total weight of the aqueous composition, of a water retention aid/thickener composition containing:

(a) from about 40 to about 75% by weight of a $C_1$–$C_8$ alkyl acrylate;

(b) from about 60 to about 25% by weight of methacrylic acid; and (c) from about 0.1 to about 5% by weight of an alkoxylated acrylate or methacrylate monomer containing at least three vinyl moieties.

The present invention also provides a paper coating composition containing from about 0.1 to about 5% by weight of the above-disclosed water retention aid/thickener composition, based on the total weight of the paper composition.

DESCRIPTION OF THE INVENTION

Other than in the operating examples, or where otherwise indicated, all numbers expressing quantities of ingredients or reaction conditions used herein are understood as being modified in all instances by the term "about".

The novel water retention aid thickeners of the present invention are made by emulsion polymerization of the following comonomers: ethyl acrylate, methacrylic acid and alkoxylated trimethylolpropane triacrylate.

The $C_1$–$C_8$ alkyl acrylate comonomer used in the invention may be derived in any known manner such as, for example, by the reaction of ethylene cyanohydrin, ethyl alcohol and dilute sulfuric acid, or the oxo reaction of acetylene, carbon monoxide and ethyl alcohol in the presence of a nickel or cobalt catalyst. In a particularly preferred embodiment of the present invention, the $C_1$–$C_8$ alkyl acrylate is ethyl acrylate comonomer.

Similarly, the methacrylic acid comonomer of the invention is also derived in a known manner such as, for example, by reacting acetone cyanohydrin with dilute sulfuric acid or by the oxidation of isobutylene. It should also be noted that while it is preferred to employ methacrylic acid as the polymeric acid comonomer in the invention, mixtures of methacrylic acid and acrylic acid in a ratio by weight of at least 9:1, respectively, may also be employed without departing from the spirit of the invention.

The crosslinking agent used in the emulsion polymerization reaction involving the above-disclosed monomers is an alkoxylated acrylate or methacrylate monomer. The acrylate or methacrylate monomers of the present invention are defined as compounds containing at least three vinyl moieties. The acrylate or methacrylate monomers are alkoxylated with from 1 to about 100 moles of ethylene oxide, propylene oxide and mixtures thereof. A particularly preferred alkoxylated acrylate is trimethylolpropane triacrylate which is alkoxylated with from about 10 to about 20 moles of ethylene oxide per mole of trimethylolpropane.

It is believed that due to the presence of alkoxylates in the acrylate or methacrylate monomers containing at least three vinyl moieties, surfactant properties are imparted to the water retention aid/thickener resulting in a synergistic water retaining/thickening property being provided. Hence, the alkoxylated acrylate or methacrylate monomer is added to the monomer mixture consisting of a $C_1$–$C_8$ alkyl acrylate and methacrylic acid in order to increase the molecular weight of the polymer after polymerization of the monomers, which improves the thickening efficiency of the polymer in an aqueous system. Moreover, the alkoxide component of the acrylate or methacrylate monomer, which is crosslinked onto the polymer mixture during emulsion polymerization, imparts surfactant properties to the polymer, thereby synergistically further enhancing the thickening properties of the polymer in aqueous systems in an unexpected manner. Thus, it is imperative according to the teaching of the invention that the acrylate or methacrylate monomers contain some degree of alkoxylation.

In one embodiment of the present invention, there is thus provided a water retention aid/thickener composition for use in aqueous systems, wherein the composition contains from about 40 to about 75% by weight, and preferably from about 65 to about 55% by weight of a $C_1$–$C_8$ alkyl acrylate, preferably ethyl acrylate, from about 60 to about 25% by weight, and preferably from about 35 to about 45% by weight of methacrylic acid and from about 0.1 to about 5% by weight, and preferably from about 0.1 to about 1.0% by weight of an alkoxylated acrylate or methacrylate monomers, based on the sum of the alkyl acrylate and methacrylic acid, preferably a trimethylolpropane triacrylate containing from 1 to about 100 moles of ethylene oxide, propylene oxide or mixtures thereof, and preferably from about 10 to about 20 moles of ethylene oxide, per mole of trimethylolpropane, all weights being based on the weight of the composition.

The above-disclosed water retention aid/thickener composition can be used to thicken various types of aqueous systems which require thickening, and in particular, alkali-containing aqueous systems. One such alkali-containing aqueous system is a paper coating composition.

The specific constituents which comprise a paper coating composition are well known in the art. Basic components include a pigment, a latex binder, a coating insolubilizer, a lubricant and a dispersant. The exact proportions of each components employed is well known and hence, need not be discussed in detail herein. The water retention aid/thickener of the present invention is added to the paper coating composition in order to control the amount of water lost by the coating composition during the paper coating process.

Thus, according to another aspect of the present invention there is provided a paper coating composition containing from about 0.1 to about 5, and preferably from about 0.1 to about 2% by weight of the water retention aid/thickener composition of the present invention, based on the total weight of the paper coating composition.

The present invention also provides a process for thickening an aqueous composition, particularly and alkali-containing paper coating composition. The process involves adding to the aqueous composition from about 0.1 to about 5, and preferably from about 0.1 to about 2% by weight of the water retention aid/thickener composition of the present invention, based on the total weight of the paper coating composition.

According to yet another aspect of the present invention, there is also provided a process for making a water retention aid/thickener. According to this aspect of the invention, a $C_1$–$C_8$ alkyl acrylate monomer, preferably ethyl acrylate, a methacrylic acid monomer, and an alkoxylated polyacrylate crosslinking monomer are combined in an aqueous emulsion in a ratio by weight of from about 65:35:0.1 to about 55:45:5, respectively. To this aqueous emulsion containing the above-disclosed components, there is also added an emulsifier and a polymerization initiator. Examples of suitable emulsifiers include, for example, the alkali metal salts and ammonium salts of n-dodecylsulfonic acid and dodecylbenzenesulfonic acid and the corresponding salts of the sulfuric acid half-esers of long-chain alcohols having an even number of carbon atoms. Examples of suitable polymerization initiators include, for example, conventional free radical-forming compounds such as peroxides, persulfates, hydroperoxides and azo compounds, examples being potassium persulfate, cumene hydroperoxide and hydrogen peroxide. The polymerization temperature lies within the range of from about 75° to about 100° C. The present invention will be better understood from the examples which follow, all of which are intended to be illustrative only and not meant to unduly limit the scope of the invention. Unless otherwise indicated, percentages are on a weight-by-weight basis.

EXAMPLE 1

In a 0.5 liter round bottom reaction flask equipped with a thermometer, condenser, stirrer, nitrogen inlet, and, several other addition inlets, was charged 106.1 grams 2.32% nonylphenol ethoxylate (9 moles EO) phosphate ester (RHODAFAC® RE-610, Rhone-Poulenc) neutralized with aqueous sodium hydroxide to pH 6.0. A nitrogen sweep was started and the contents of the reaction flask were heated to 85° C. To a 60 ml syringe attached to a micro delivery pump, were charged 30 grams of a 1.25% ammonium persulfate solution (initiator feed). To a 500 ml dropping addition flask, was charged a monomer dispersion made by mixing together a monomer solution consisting of 71.9 grams ethyl acrylate, 48.0 grams methacrylic acid, and 0.6 grams trimethylolpropane ethoxylate (12 moles EO)triacrylate (PHOTOMER® 1201-C, Henkel Corp.) and 106.1 grams 2.32% nonylphenol ethoxylate (9 moles EO) phosphate ester (RHODAFAC® RE-610, Rhone-Poulenc) neutralized with aqueous sodium hydroxide to pH 6.0 (monomer feed). After reaching 85° C., 9.8 grams of initiator feed followed by 13.3 grams of monomer feed were rapidly added to the reactor. Heating continued at 85° C. for 15 minutes and, after which, the remaining monomer feed and 9.8 grams of the initiator feed were delivered to the reactor over 60 minutes at 85° C. (temperature 1). On completion of the monomer feed and 9.8 grams of the initiator feed, the temperature was increased to 90° C. (temperature 2) and the remaining initiator solution (10.8 grams) was added. The reactor contents were held for an additional 60 minutes at 90° C. after completion of the initiator feed, before cooling to 25° C. and discharging the emulsion. The resulting emulsion was milky white with some blueness with a brookfield viscosity of 12 cps (spindle #2 at 60 rpm at 25° C.), solids of 30.7%, a pH of 3.0, and an alkaline (pH 8.5) 2.5% polymer solution viscosity of 1,070 cps (spindle #2 at 60 rpm at 25° C.).

EXAMPLES 2-9

Statistically designed experiments were conducted using the procedure described in Example 1. Table 1 lists parameters (initiator concentration, crosslinker concentration, and temperature) that were varied for each of the 8 different experiments. The resulting emulsions were milky white with some blueness with a brookfield viscosity below 20 cps (spindle #2 at 60 rpm at 25° C.) and a pH of 3.0. Solution viscosities of 2.5 % polymer at pH 8.5 were measured with a brookfield viscometer at 25° C.

TABLE 1

Variables from statistical designed experiments.

| Experiment No. | Initiator On Total Weight of Monomer | Crosslinker (g) | Temp 1 (°C.) | Temp 2 (°C.) | Solids (%) | Viscosity (cps) |
| --- | --- | --- | --- | --- | --- | --- |
| 1 | 0.32 | 0.5 | 85 | 90 | 30.7 | 1070 |
| 2 | 0.16 | 0.3 | 75 | 80 | 29.1 | 6000 |
| 3 | 0.16 | 0.3 | 90 | 95 | 29.9 | 4600 |
| 4 | 0.16 | 1.2 | 75 | 80 | 29.6 | 4000 |
| 5 | 0.63 | 1.2 | 90 | 95 | 27.6 | 1840 |
| 6 | 0.63 | 0.3 | 75 | 80 | 29.5 | 860 |
| 7 | 0.63 | 0.3 | 90 | 95 | 29.1 | 630 |
| 8 | 0.63 | 1.2 | 75 | 80 | 28.1 | 11200 |
| 9 | 0.63 | 1.2 | 90 | 95 | 29.4 | 3300 |

Comparative Example 1

Example 1 was repeated without crosslinker, trimethylolpropane ethoxylate (12 moles EO) triacrylate. The resulting emulsion was milky white with some blueness with a brookfield viscosity below 20 cps (spindle #2 at 60 rpm at 25° C.), solids of 30.2%, a pH of 3.0, and an alkaline (pH 8.5) 2.5% polymer solution viscosity of 76 cps (spindle #3 at 60 rpm at 25° C.).

Comparative Example 2

Example 1 was repeated using 0.2 g of trimethyloylpropane triacrylate in place of the trimethylolpropane ethoxylate (12 moles EO) triacrylate. The resulting emulsion was milky white with some blueness with a brookfield viscosity of below 20 cps (spindle #2 at 60 rpm at 25° C.), solids of 30.0%, a pH of 3.0, and an alkaline (pH 8.5) 2.5% polymer solution viscosity of 440 cps (spindle #3 at 60 rpm at 25° C.).

Comparative Example 3

Example 1 was repeated using 0.16 g of ethylene glycol dimethoxylate in place of the trimethylolpropane ethoxylate (12 moles EO) triacrylate (Photomer 1201-E, Henkel Corp.). The resulting emulsion was milky white with some blueness with a brookfield viscosity of below 20 cps (spindle #2 at 60 rpm at 25° C.), solids of 30.0%, a pH of 3.0, and an alkaline (pH 8.5) 2.5% polymer solution viscosity of 110 cps (spindle #3 at 60 rpm at 25° C.).

Comparison of water retention data emulsions (with and without crosslinker) with blank (Rotogravure coating color 12pts SBR Latex), are given in Table 2. The blank represents an aqueous coating composition containing no thickener. Water retention data was obtained using an AA-GWR Water Retention Meter available from Kaltec Scientific Industries. This device measures the amount of water that is dewatered from a composition under a pressure of 15 psi at 120 second intervals. The viscosity data represents a brookfield viscosity at 100 rpm at 25° C.

TABLE 2

Water Retention data

| Sample | Conc. (% solids) | AA-GWR (g/m2) | Viscosity (cps) |
| --- | --- | --- | --- |
| blank | — | 222.0 | 100 |
| Example 1 | 0.2 | 130 | 1576 |
| Comparative Example 1 | 0.2 | 131 | 584 |

As can be seen from the data obtained in Table 2 above, using equal amounts of the water retention aid/thickener of Example 1 and the thickener of Comparative Example 1 unexpectedly yields similar water retention properties yet significantly increased viscosity properties.

What is claimed is:

1. A water retention aid/thickener composition comprising:
   (a) from about 40 to about 75% by weight of a $C_1$–$C_8$ alkyl acrylate;
   (b) from about 60 to about 25% by weight of methacrylic acid; and
   (c) from about 0.1 to about 5% by weight of an alkoxylated acrylate or methacrylate monomer containing at least three vinyl moieties, all weights being based on the weight of the composition.

2. The composition of claim 1 wherein the $C_1$–$C_8$ alkyl acrylate is ethyl acrylate.

3. The composition of claim 1 wherein the alkoxylated acrylate or methacrylate monomer contains from about 1 to about 100 moles of an alkoxide selected from the group consisting of ethylene oxide, propylene oxide, and mixtures thereof.

4. The composition of claim 3 wherein the alkoxylated acrylate or methacrylate monomer contains from about 10 to about 20 moles of ethylene oxide.

5. The composition of claim 1 wherein the alkoxylated acrylate or methacrylate monomer is trimethylolpropane triacrylate alkoxylate.

6. The composition of claim 5 wherein the trimethylolpropane triacrylate alkoxylate contains from about 10 to about 20 moles of ethylene oxide.

7. An aqueous composition comprising from about 0.1 to about 5% by weight, based on the total weight of the aqueous composition, of a water retaining aid/thickener composition containing:
   (a) from about 40 to about 75% by weight of a $C_1$–$C_8$ alkyl acrylate;
   (b) from about 60 to about 25% by weight of methacrylic acid; and
   (c) from about 0.1 to about 5% by weight of an alkoxylated acrylate or methacrylate monomer containing at least three vinyl moieties, the weights of components (a)–(c) being based on the weight of the water retention aid/thickener composition.

8. The composition of claim 7 wherein the $C_1$–$C_8$ alkyl acrylate is ethyl acrylate.

9. The composition of claim 7 wherein the alkoxylated acrylate or methacrylate monomer contains from about 1 to about 100 moles of an alkoxide selected from the group consisting of ethylene oxide, propylene oxide, and mixtures thereof.

10. The composition of claim 9 wherein the alkoxylated acrylate or methacrylate monomer contains from about 10 to about 20 moles of ethylene oxide.

11. The composition of claim 7 wherein the alkoxylated acrylate or methacrylate monomer is trimethylolpropane triacrylate alkoxylate.

12. The composition of claim 11 wherein the trimethylolpropane triacrylate alkoxylate contains from about 10 to about 20 moles of ethylene oxide.

13. The composition of claim 7 wherein the aqueous composition is a paper coating composition.

14. A process for making a water retention aid/thickener composition comprising:

(a) providing a $C_1$–$C_8$ alkyl acrylate monomer;

(b) providing a methacrylic acid monomer;

(c) providing an alkoxylated acrylate or methacrylate crosslinking monomer containing at least three vinyl moieties; and (d) polymerizing components (a)–(c) in an aqueous emulsion.

15. The process of claim 14 wherein step (d) is performed at a temperature ranging from about 75° to about 100° C.

16. The process of claim 14 wherein the $C_1$–$C_8$ alkyl acrylate is ethyl acrylate.

17. The process of claim 14 wherein the alkoxylated acrylate or methacrylate monomer contains from about 1 to about 100 moles of an alkoxide selected from the group consisting of ethylene oxide, propylene oxide, and mixtures thereof.

18. The process of claim 17 wherein the alkoxylated acrylate or methacrylate monomer contains from about 10 to about 20 moles of ethylene oxide.

19. The process of claim 14 wherein the alkoxylated acrylate or methacrylate monomer is trimethylolpropane triacrylate alkoxylate.

20. The process of claim 19 wherein the trimethylolpropane triacrylate alkoxylate contains from about 10 to about 20 moles of ethylene oxide.

21. A process for modifying the rheological properties of an aqueous alkali-containing composition comprising adding to the aqueous alkali-containing composition from about 0.1 to about 5% by weight, based on the total weight of the aqueous composition, of a water retention aid/thickener composition containing:

(a) from about 40 to about 75% by weight of a $C_1$–$C_8$ alkyl acrylate;

(b) from about 60 to about 25% by weight of methacrylic acid; and (c) from about 0.1 to about 5% by weight of an alkoxylated acrylate or methacrylate monomer containing at least three vinyl moieties, the weights of components (a)–(c) being based on the weight of the water retention aid/thickener composition.

22. The process of claim 21 wherein the $C_1$–$C_8$ alkyl acrylate is ethyl acrylate.

23. The process of claim 21 wherein the alkoxylated acrylate or methacrylate monomer contains from about 1 to about 100 moles of an alkoxide selected from the group consisting of ethylene oxide, propylene oxide, and mixtures thereof.

24. The process of claim 23 wherein the alkoxylated acrylate or methacrylate monomer contains from about 10 to about 20 moles of ethylene oxide.

25. The process of claim 21 wherein the alkoxylated acrylate or methacrylate monomer is trimethylolpropane triacrylate alkoxylate.

26. The process of claim 25 wherein the trimethylolpropane triacrylate alkoxylate contains from about 10 to about 20 moles of ethylene oxide.

27. The process of claim 21 wherein the aqueous alkali-containing composition is a paper coating composition.

\* \* \* \* \*